(12) United States Patent
Willis et al.

(10) Patent No.: US 10,552,220 B2
(45) Date of Patent: Feb. 4, 2020

(54) SIZING OF ONE OR MORE JOBS WITHIN ONE OR MORE TIME WINDOWS

(71) Applicant: QUEST SOFTWARE INC., Aliso Viejo, CA (US)

(72) Inventors: Tomas Charles Nelson Willis, Madison, WI (US); Yinghua Qin, GuangDong (CN)

(73) Assignee: QUEST SOFTWARE INC., Aliso Viejo, CA (US)

(*) Notice: Subject to any disclaimer, the term of this patent is extended or adjusted under 35 U.S.C. 154(b) by 207 days.

(21) Appl. No.: 14/869,758

(22) Filed: Sep. 29, 2015

(65) Prior Publication Data

US 2017/0031715 A1  Feb. 2, 2017

Related U.S. Application Data

(63) Continuation-in-part of application No. 14/815,221, filed on Jul. 31, 2015.

(51) Int. Cl.
*G06F 9/48* (2006.01)
*G06F 9/50* (2006.01)
*G06F 11/30* (2006.01)

(52) U.S. Cl.
CPC .......... *G06F 9/5011* (2013.01); *G06F 9/4881* (2013.01); *G06F 11/3034* (2013.01); *G06F 2209/485* (2013.01); *G06F 2213/0062* (2013.01)

(58) Field of Classification Search
CPC ........ G06F 9/50; G06F 9/5005; G06F 9/5011; G06F 9/5016; G06F 9/5027; G06F 9/505; G06F 9/5094; G06F 3/0653; G06F 11/30; G06F 11/3034; G06F 11/3058; G06F 9/4881; G06F 2213/0062; G06F 2209/485
See application file for complete search history.

(56) References Cited

U.S. PATENT DOCUMENTS

| | | | |
|---|---|---|---|
| 6,553,419 B1* | 4/2003 | Ram | G06F 11/3476 709/224 |
| 8,875,143 B2* | 10/2014 | Piazza | G06F 9/4881 718/102 |
| 9,590,876 B2* | 3/2017 | Purusothaman | H04L 43/045 |
| 9,870,434 B1* | 1/2018 | Ratsaby | G06F 16/904 |
| 2004/0205206 A1* | 10/2004 | Naik | H04L 29/06 709/230 |
| 2005/0091369 A1* | 4/2005 | Jones | H04L 41/06 709/224 |

(Continued)

*Primary Examiner* — Emerson C Puente
*Assistant Examiner* — Jonathan R Labud
(74) *Attorney, Agent, or Firm* — Maschoff Brennan

(57) ABSTRACT

Aspects of the present invention provide systems and methods that ascertain appropriate time windows for when a task or tasks are best suited to be performed and also for appropriately sizing the number of tasks so that they can be completed within a window or windows. In embodiments, a system for estimating a system resource comprises a component selection system configured to receive a selection of one or more components and/or one or more metrics to be monitored. In embodiments, an analyzer uses at least some of the gathered data to determine one or more resource capacity windows for performing a task or tasks and determines an appropriate job size or sizes for scheduling the tasks to be performed within the one or more resource capacity windows.

16 Claims, 8 Drawing Sheets

(56) References Cited

U.S. PATENT DOCUMENTS

| | | | |
|---|---|---|---|
| 2006/0150105 A1* | 7/2006 | Bright | G06F 11/0715 715/736 |
| 2010/0061260 A1* | 3/2010 | Bugenhagen | H04L 12/2602 370/252 |
| 2012/0155704 A1* | 6/2012 | Williams | G01W 1/00 382/103 |

* cited by examiner

SIZING OF ONE OR MORE JOBS WITHIN ONE OR MORE TIME WINDOWS

CROSS-REFERENCE TO RELATED APPLICATION

The patent application claims priority to and is a continuation-in-part of co-pending and commonly-owned U.S. patent application Ser. No. 14/815,221 filed on 31 Jul. 2015, entitled "AUTOMATIC DETERMINATION OF OPTIMAL TIME WINDOW FOR MIGRATION, BACKUP OR OTHER PROCESSES," listing Thomas Willis as inventor the above-mentioned patent document is incorporated by reference herein in its entirety and for all purposes.

A. TECHNICAL FIELD

The present disclosure relates generally to network management, and more specifically to a system and method for automatic scheduling tasks within a time window or windows for one or more various tasks, such as migration, backup, archiving, or other processes.

B. DESCRIPTION OF THE RELATED ART

Currently, it is known to monitor the use of open systems interconnect (OSI) Layer 1 (physical) through Layer 3 (network) levels of the OSI model for a network, to assist a dynamic controller with allocation and distribution of network bandwidth in a multi-protocol label switch. However, prior systems do not facilitate determination of an optimal time window for migration, backup, archiving, or other processes that utilize processing resources of other OSI layers.

Processes that utilize a computer-related resource can disrupt the use of a system by regular users if the load from these processes consume too much of the resource. For example, the process of moving large amounts of data across a network path (e.g., for backup, data migration, and archiving purposes) can overwhelm the network bandwidth and severely degrade network performance for other users.

Accordingly, what is needed are systems and methods that ascertain appropriate time windows for when a task or tasks are well suited to be performed and also for appropriately sizing the number of tasks so that they can be completed within a window or windows.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

DETAILED DESCRIPTION OF THE PREFERRED EMBODIMENTS

Figure 1:
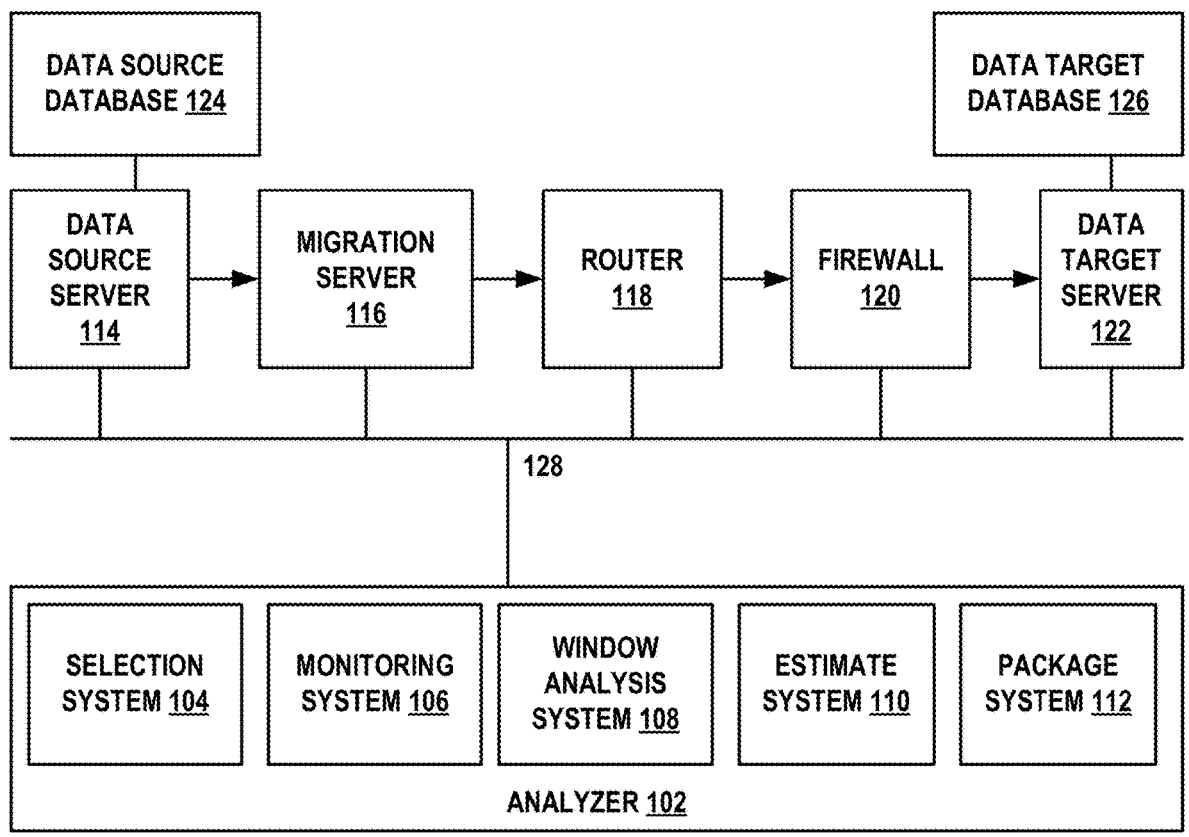
FIG. 1 is a diagram of a system for automatic determination of a time window or windows for one or more functions or tasks (such as, migration, backup, archiving, or other processes), in accordance with embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The term or phrases "computer-related resource," "processor-related resource," "network resource," "system resource," or the like refer to one or more resources or metrics related to processor-related items; these items may include such resources as, by way of example, bandwidth, computer processing unit (CPU) usage, memory I/O speed, memory usage, database usage, application performance, virtual machine performance, hardware performance, software performance, or combinations thereof, and may be related to a single device or multiple devices. The terms "messages," "blocks," and "data," shall be understood to mean a group of bits that can be transported across a network. These terms shall not be interpreted as limiting embodiments of the present invention to particular configuration; and, these terms along with similar terms such as "data," "data traffic," "information," "cell," etc. may be replaced by other terminologies referring to a group of bits, and may be used interchangeably. The terms "include," "including," "comprise," and "comprising" shall be understood to be open terms and any lists the follow are examples and not meant to be limited to the listed items. Any headings used herein are for organizational purposes only and shall not be used to limit the scope of the description or the claims.

Furthermore, it shall be noted that: (1) certain steps may optionally be performed; (2) steps may not be limited to the specific order set forth herein; (3) certain steps may be performed in different orders; and (4) certain steps may be done concurrently.

Aspects of the present invention comprise systems and/or methods that ascertain appropriate time windows for when a task or tasks are well suited to be performed and also for appropriately sizing the number of tasks so that they can be completed within a window or windows.

As noted, the prior approaches do not aid with scheduling or run-time throttling of processes, which may be based on historical data, not just live or dynamic data. By monitoring historical data on the usage of a one or more resources (e.g., important system resources like CPU usage on a source or target server or disk input/output (I/O) rates), meaningful data can be provided for use in scheduling one or more tasks or processes that may be resource intensive.

In embodiments, the present disclosure utilizes components to measure one or more metrics, such as network bandwidth consumption over part of a network between a source and a target (which may be selected by a user), and over a time period of interest (which also may be selected by a user), to develop a time series over a time range of interest (e.g., hours, days, weeks, weekdays, weekends, etc.) from which a time window or windows may be selected for performing one or more tasks related to the one or more metrics (e.g., network bandwidth intensive functions such as backup, migration, or archiving). Using, by way of example, "bandwidth," in this regard, "bandwidth" is not simply the data transfer capacity of the network, which is an OSI Layer 1 through Layer 3 metric, but rather the capability for the servers, databases, routers, firewalls and other network components between the endpoints to perform the selected function. Such functions are generally performed at OSI Layer 4 and Layer 7, but could include other suitable OSI layer functionality. In embodiments, for gathered historical data to be an accurate representation of future performance, it may be important to know the associated function that is to be performed and also to know how each component that is required to perform that function is loaded, since a single component that is heavily loaded could result in a significant degradation (e.g., significant loss of bandwidth) even when all other components are unloaded and available to perform the selected function.

In this regard using the network bandwidth example, in embodiments, it is preferred for the exact network route that is to be used for the bandwidth-consuming operation (including but not limited to migration, backup, archiving, file transfer, etc.) to be identified, which may involve an operator to either perform the selected operation on a limited scale and to monitor which components are used, or to otherwise accurately model the operation using other processes so that the operator can be notified of the necessary components and of any options. Windows for the bandwidth-intensive operations can be calculated automatically or may optionally include feedback from an administrator. One or more windows may be found in a time period of interest (e.g., hour, day, weekday, weekend period, work week, etc.), during sustained periods of low consumption of the relevant network resource(s). The automated application of these data processing functions to the problem of the scheduling of operations such as migrations, backup, file transfer, and archiving is thus one aspect of the present disclosure.

FIG. 1 is a diagram of a system 100 for automatic determination of a time window for one or more functions or tasks (such as, migration, backup, archiving, or other processes), in accordance with an exemplary embodiment of the present disclosure. System 100 may be implemented in hardware or a suitable combination of hardware and software.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In embodiments, software may include one or more lines of code or other suitable software structures operating in a general purpose software application, such as an operating system, and one or more lines of code or other suitable software structures operating in a specific purpose software application. Without limiting the foregoing, as used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

In embodiments, system 100 includes network analyzer 102, which further includes metric/component selection system 104, component monitoring system 106, window analysis system 108, estimate system 110, and package system 112, each of which may be implemented as one or more hardware systems or a suitable combination of hardware and software. In embodiments, analyzer 102 may be further coupled to data source server 114, migration server 116, router 118, firewall 120, and data target server 122 over network 128, and may also be directly coupled to data source database 124 and data target database 126, may be coupled to those components through data source server 114 and data target server 122 as shown, or may be coupled in other suitable manners. In embodiments, analyzer 102 or one or more components thereof (including one or more duplicate components) may reside on one or more of the devices in FIG. 1.

In this exemplary embodiment, data source server 114 can be a suitable server, such as a Novell GroupWise mail server, and data target server 122 can be a different server that is operationally or functionally related to data source server 114, such as a Microsoft Exchange server, and where the enterprise is migrating from the Novell GroupWise mail server to the Microsoft Exchange server. These servers are provided for exemplary purposes only, and other suitable functions can also or alternatively be performed by data source server 114 and data target server 122, such as a source file server and a target file storage device, a source application server and a target alternate application server, and so forth. During the migration, data is to be transferred from data source server 114, through migration server 116, router 118, and firewall 120 before reaching data target server 122. In embodiments, the route that would be taken during the bandwidth-consuming operation (e.g., migration, backup, archiving, or other functions) defines the network under study, which thus may exclude other network systems and components that are not part of that route, even though such other network components may impose loading on the components that are part of the route and which may therefore have an impact on the bandwidth of the route. In embodiments, network traffic across this user-defined network may be measured over time by a suitable system, such as the Dell Foglight® system by Dell of Round Rock, Tex., the open source rrdtool (round-robin database tool, which provides data logging and graphing system for time series data), a Dell-managed network switch like the Dell PowerConnect®, or other suitable systems or devices, to develop a time series of bandwidth consumption by each selected component.

In embodiments, metric/component selection system 104 may receive one or more component selections that are used to define the user-selected network/system or may define a metric or metrics to be monitored. In embodiments, metric/component selection system 104 can generate a graphic user interface that displays a network topology map by detecting components on a network, and can receive a user selection of one or more components, one or more intervening components and other suitable components associated with a predetermined function or functions (or metrics), including but not limited to migration, backup, archiving, and file transfer. In embodiments, component selection system 104 can also or alternatively generate selected components that can be required for a predetermined function or functions, such as to assist the user with identification of all necessary components, to prompt the user to select one or more redundant components or for other suitable purposes.

In embodiments, component monitoring system 106 monitors one or more metrics related to one or more functions/metrics. For example, in embodiments, component monitoring system 106 monitors one or more network component bandwidth metrics, such as data transfer capacity and loading, processing capacity and loading, random access memory capacity and loading, database performance, mail store performance, mail server application performance, relative virtual machine performance, or other suitable metrics, and stores the monitored metric(s) over time for subsequent analysis and monitoring. In embodiments, component monitoring system 106 can continuously monitor metrics for all network components, can monitor metrics for user-selected components over a user-selected period of time, or can perform other suitable functions. In embodiments, components that are impacted by a function that is performed by other components can be identified, such as to identify components that should be included in a user-defined network for a predetermined function or other suitable components.

In embodiments, window analysis system 108 receives gathered data for the identified one or more metrics related to the appropriate component(s) and may identify one or more periods or time windows or may generate data in a suitable format to allow a user to determine one or more periods or time windows for performing a predetermined function (or task), including but not limited to migration, backup, archiving, and file transfer. In embodiments, window analysis system 108 may generate a loading diagram to allow a user to visually determine the optimal period(s) for performing such functions. In embodiments, window analysis system 108 may receive data from estimate system 110, package system 112, or other suitable systems and can generate modified loading diagrams that show the loading before and after implementing a plan for performing a set of one or more tasks of a predetermined function or functions, including but not limited to migration, backup, archiving and file transfer.

In embodiments, estimate system 110 receives gathered data and data defining a predetermined function (or functions), including but not limited to migration, backup, archiving and file transfer, and generates estimate data for performing the predetermined function with the system from which the data was collected. In embodiments, estimate system 110 can store metric data for the predetermined function as it was previously performed on the same or other systems, on the same or other networks or other suitable data that can be used to provide an estimate of the length of time, loading, resources, or other factors associated with the predetermined function. In embodiments, estimate system 110 can generate estimates for metrics based on known parameters, such as processing speeds, file sizes, loading and other parameters for components in a system or network.

In embodiments, package system 112 data and schedules distinct packages that can be independently processed for a task or function. In embodiments, for example, package system 112 receives information about data that is to be moved from a first system to a second system and the predetermined function may be migration from the first system to the second system, where the entire organization needs to be migrated within the same time period, such as over a weekend. In embodiments, package system 112 can allow a user to structure the migration as a function of a time zone for each user, such as to start the migration for users on the east coast of the U.S. first and to add users from other time zones at predetermined times, such as 5:00 pm on Friday for each time zone. Furthermore, in embodiments, the package system 112 may receive window information from the window analysis system 108 and may use the estimate system 100 to determine capacity of a window or windows and schedule one or more tasks to be completed within the time window(s) and within the capacity. Similarly, in embodiments, backup, archiving, file transfer, and other suitable functions can be packaged to allow the function to be performed at optimal times, such as to backup or archive files for a first set of users over a first week, for a second set of users over a second week and so forth, to transfer files for a first set of users at a first time of day and for a second set of users at a second time of day, and so forth.

In operation, system 100 allows a user to analyze a system, such as a network, to determine one or more time windows for performing a function or functions, so as to minimize the impact on normal operations, to stage the function, and to otherwise manage the function to prevent inadvertent downtime or misoperation of the components of the system.

Figure 2:
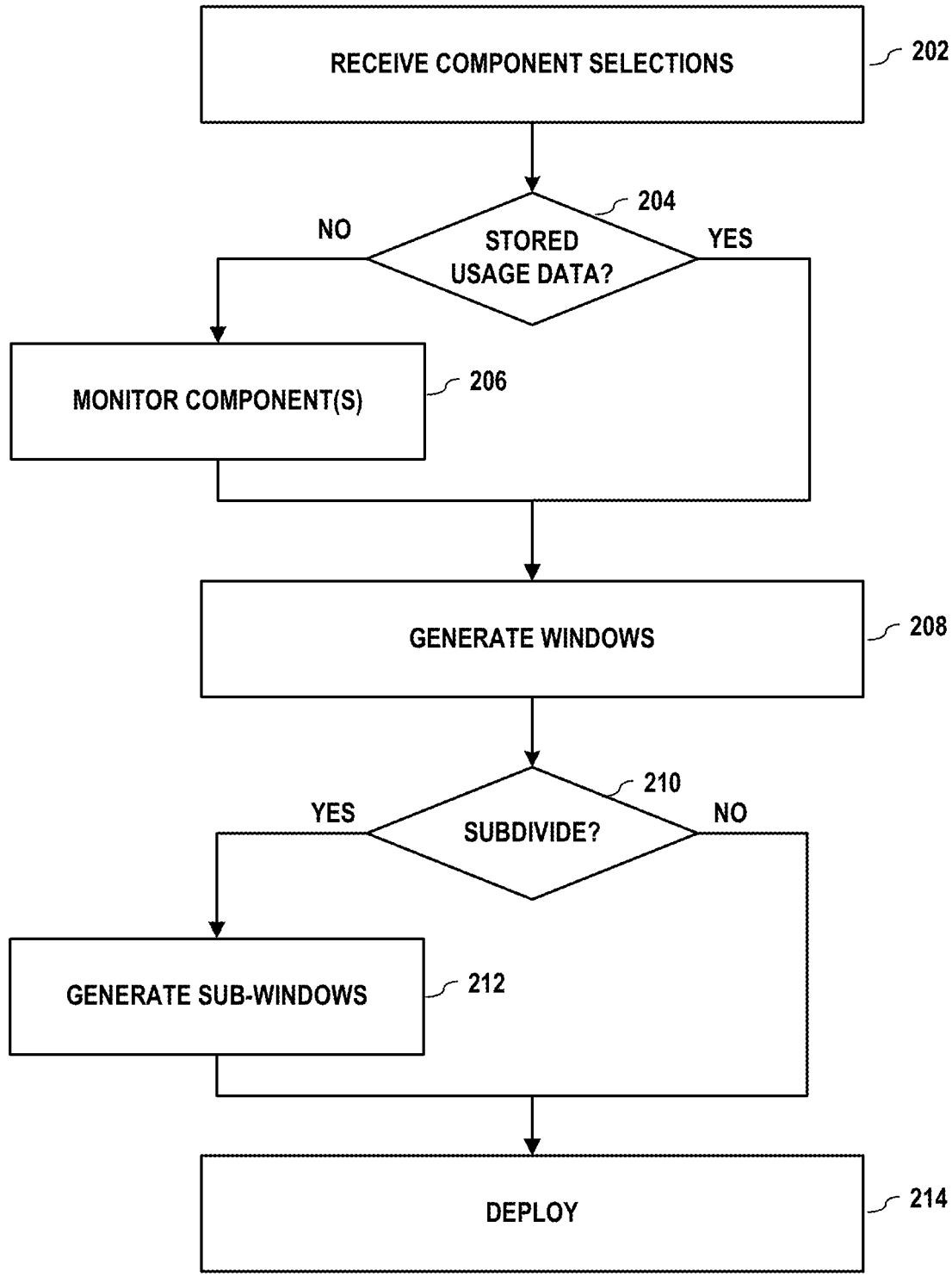
FIG. 2 is a diagram of an algorithm for automatic determination of a time window for one or more functions or tasks (such as, migration, backup, archiving, or other processes), in accordance with embodiments of the present disclosure.

FIG. 2 is a diagram of an algorithm 200 for automatic determination of a time window for one more functions (e.g., migration, backup, archiving, or other processes), in accordance with an exemplary embodiment of the present disclosure. In embodiments, algorithm 200 can be implemented in hardware or a suitable combination of hardware and software. Although algorithm 200 is shown as a flowchart, object oriented programming, state diagrams or other suitable programming paradigms can also or alternatively be used to implement algorithm 200.

In embodiments, algorithm 200 begins at 202 where component selections are received to create a user-defined network. In embodiments, a user-defined network can be generated by a user selecting one or more system components, an associated function that is to be performed (e.g., including but not limited to migration, backup, archiving, and file transfer), by selecting components between the components to perform the function, or in other suitable manners. The user-defined network can be selected from components that are automatically detected, can be entered by the user, or other suitable processes can also or alternatively be used. The algorithm then proceeds to 204.

In embodiment, at 204, it is determined whether there is stored usage data. In embodiments, usage data for a component or components can be stored on an ongoing basis, such as by monitoring processor load, dynamic access memory usage, data transmission bandwidth, or other suitable metrics. In embodiments, if it is determined that there is stored usage data, then the algorithm proceeds to 208, otherwise the algorithm proceeds to 206.

In embodiments, at 206, the component(s) of the user-selected network are monitored for usage data. In embodiments, a user can be prompted to select types of metrics as a function of component, time periods, and other suitable monitoring data. In embodiments, all metrics for all components in the user-defined network can be monitored. Likewise, in embodiments, other suitable processes can also or alternatively be used. In embodiments, the algorithm then proceeds to 208.

In embodiments, at 208, the usage data is used to generate network resource window(s). In embodiments, a loading curve can be generated that shows percentage of capacity that is available as a function of time. In other exemplary embodiments, available time windows for the selected function can be generated, loading curves showing component loading while the process is being performed, or other suitable data can be generated. In embodiments, the algorithm then proceeds to 210.

In embodiments, at 210, it is determined whether the function can be subdivided. If the function cannot be subdivided, in embodiments, the algorithm proceeds to 214 where the function may be deployed, otherwise the algorithm proceeds to 212 where sub-windows are generated. In embodiments, a sub-window can be generated and modified as a function of a subset of data that can be separately processed for the selected function, such as to identify a group of users that can be migrated separately from other users, a group of users in a different time zone, to add or delete users from groups, to change the order of subsets, or to performs other suitable functions on subsets of users. In embodiments, the algorithm then proceeds to 214.

In embodiments, in operation, algorithm 200 allows a user-defined network to be identified and further allows a function that is to be performed on the user-defined network, including but not limited to migration, backup, archiving, and file transfer, to be identified and modelled. Algorithm 200 thus allows a user to schedule functions for a user-defined network at times when the normal operation of the components of the user-defined network will not be adversely affected.

Figure 3:
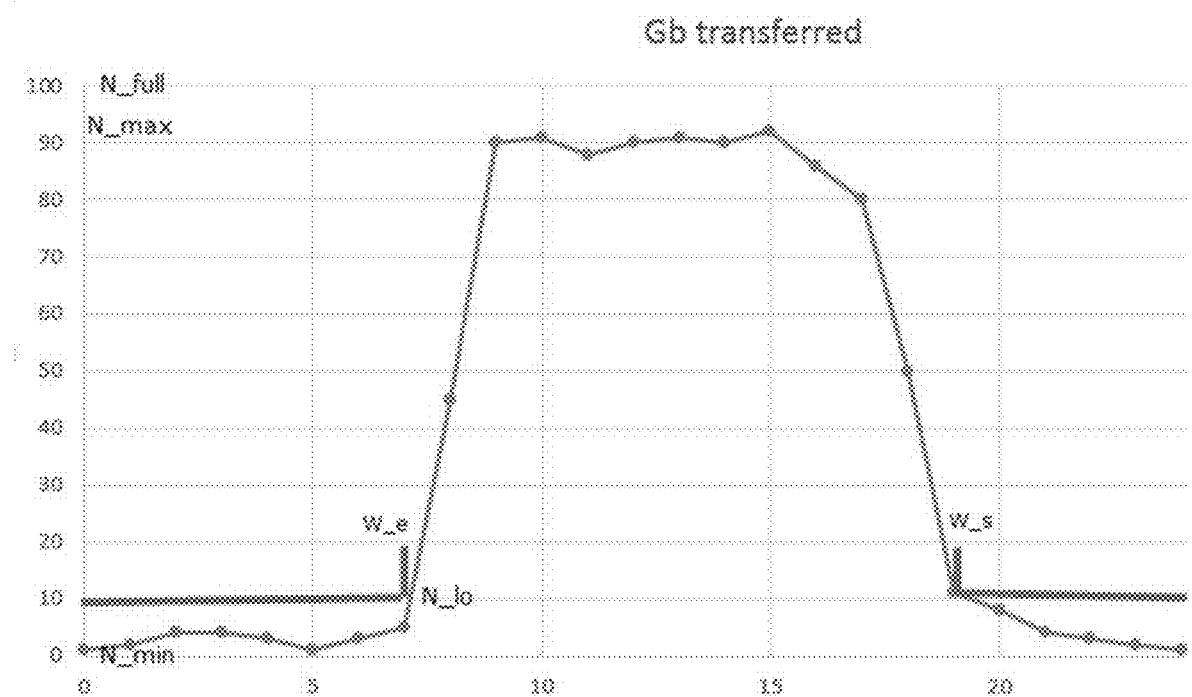
FIG. 3 is a diagram of a user-defined network loading with a single peak, in accordance with embodiments of the present disclosure.

FIG. 3 is a diagram 300 of a user-defined network loading with a single peak, in accordance with embodiments of the present disclosure. In a simple case, as for the network of a single-location business where work normally occurs between 9:00 am and 5:00 pm, the bandwidth consumption can be represented by the data set of diagram 300, where the lowest bandwidth consumption is designated N_min, the highest recorded consumption is N_max, and the maximum possible bandwidth is N_full. In embodiments, a threshold level, N_lo, may be set that distinguishes a low-usage time period from a high-consumption time period. In this case, looking for an operations window across the period of a day, the automatically calculated operations window is from W_s (window start) in the evening to W_e (window end) in the early morning. In the depicted graph, the vertical axis is bandwidth consumed across the measured section of network at a given time, and the horizontal axis is hour of the day.

Figure 4:
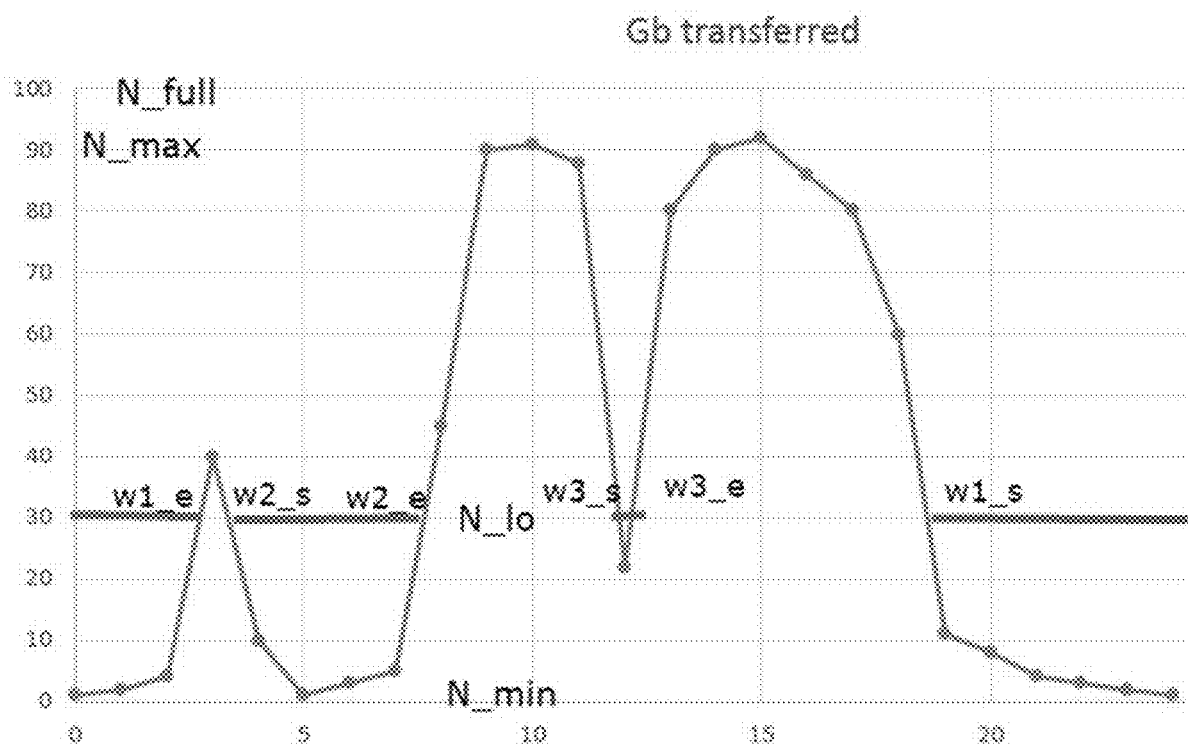
FIG. 4 is a diagram of a user-defined network loading with multiple peaks for a first function, in accordance with embodiments of the present disclosure.

FIG. 4 is a diagram 400 of a user-defined network loading with multiple peaks for a first function, in accordance with embodiments of the present disclosure. Diagram 400 shows a more complicated network usage pattern, including an early morning spike due to some other network activities such as batch emails, and a mid-day slump in usages when the workers normally go to lunch. In this example, there are three possible operations windows for a function: the evening until the batch operations are performed, the morning after batch operations are performed, and a narrow lunch-time window, respectively defined by the start/stop pairs (w1_s, w1_e), (w2_s, w2_e), and (w3_s, w3_e). The administrators may elect not to use an operations windows as narrow as the mid-day gap, so a minimum width of the operations window can be defined. In addition, in embodiments, the administrator may manually define restricted time windows, and the generated operations windows can reflect these manually-defined parameters. The windows can be different for different days of the week. The period over which windows are automatically calculated would normally be a day, but any suitable interval can also or alternatively be used. It shall be noted that, in embodiments, one or more tasks may be schedule for windows based upon capacity of the window. For example, the capacity of the mid-day gap may be assessed and correspondingly-sized task or tasks may be scheduled to be performed during that time window.

Figure 5:
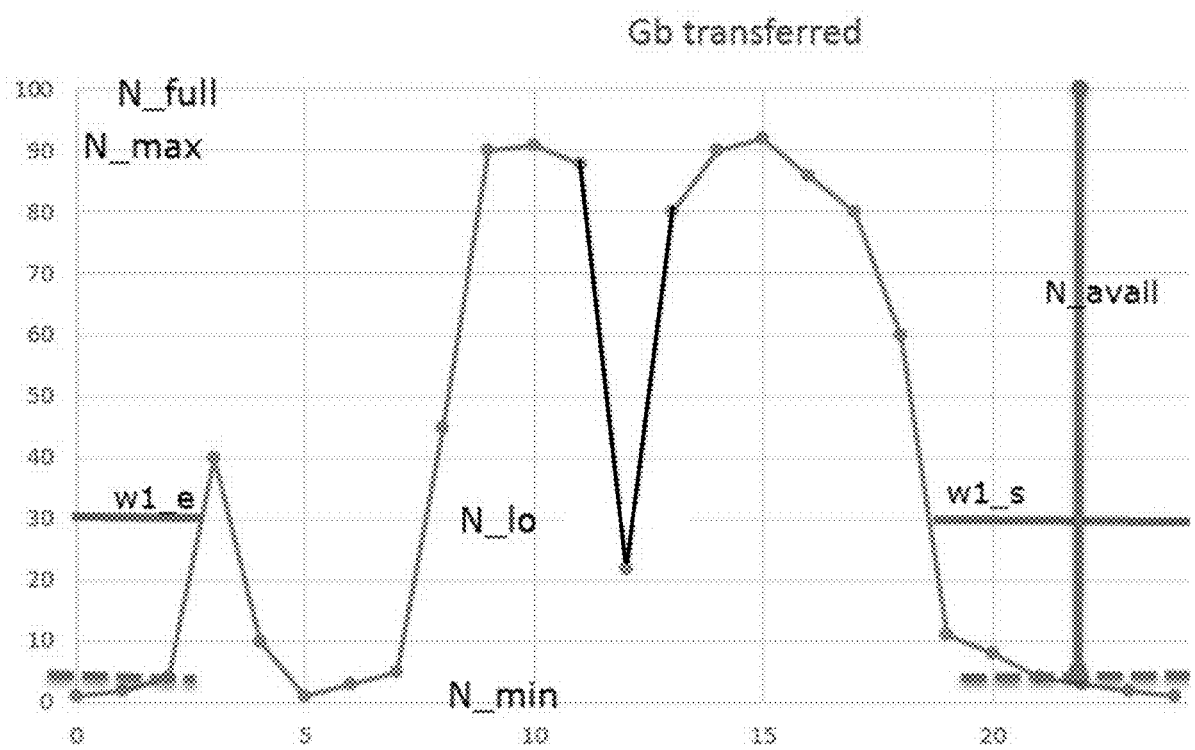
FIG. 5 is a diagram of a user-defined network loading with multiple peaks for a second function, in accordance with embodiments of the present disclosure.

FIG. 5 is a diagram 500 of a user-defined network loading with multiple peaks for a second function, in accordance with embodiments of the present disclosure. In embodiments, the general amount of bandwidth typically available to a bandwidth-consuming operation in a given time window can also or alternatively be provided, from the vertical measurement N_avail (e.g., N_full−N_min), as shown— although other measurements may be used. In embodiments, migration, archiving, backup and other products that have controllable network metric consumption parameters can be controlled to adjust their usage not to exceed the expected amount of bandwidth available in a given window.

Figure 6:
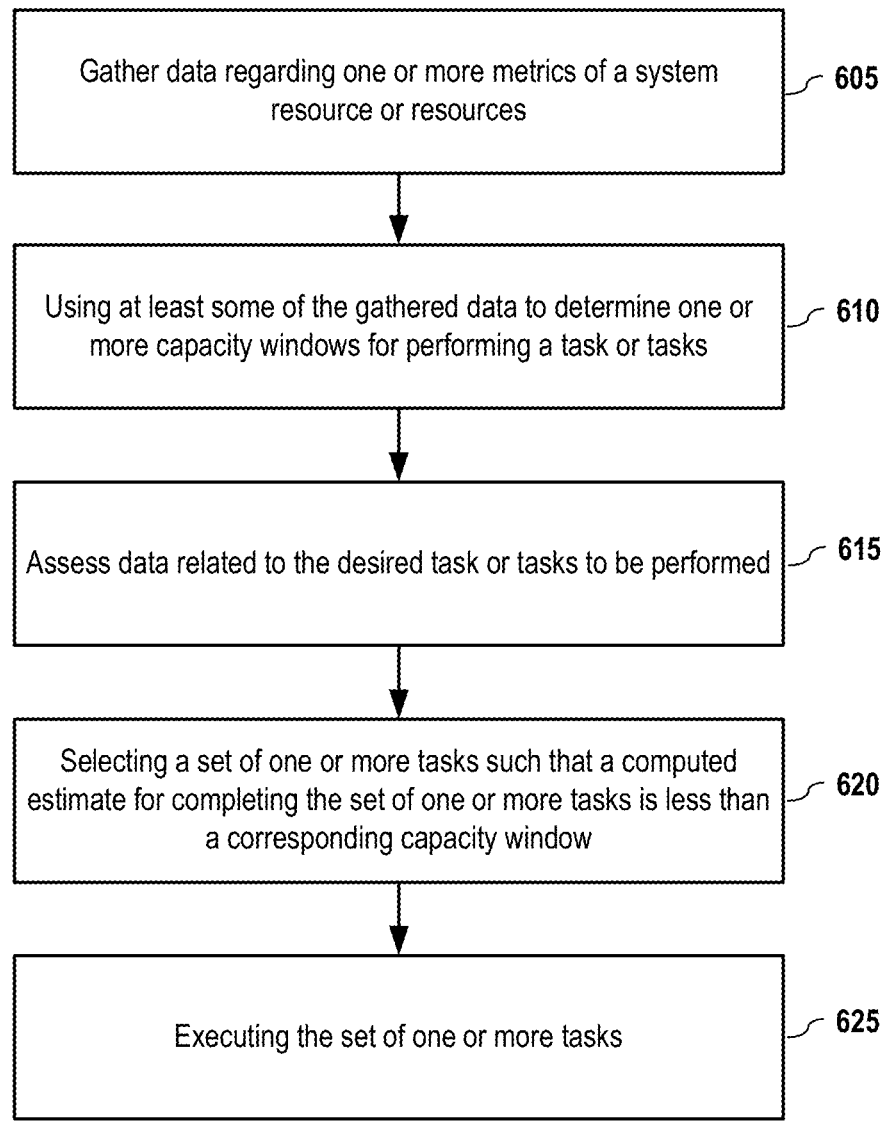
FIG. 6 is a diagram of an algorithm for scheduling one or more tasks to be performed within one or more identified time windows, in accordance with embodiments of the present disclosure.

FIG. 6 is a diagram of an algorithm for scheduling one or more tasks to be performed within one or more identified time windows, in accordance with embodiments of the present disclosure. In embodiments, data is gathered (605) regarding one or more metrics of a system resource or resources. As noted previously, the metric(s) may be bandwidth, CPU usage, memory usage, etc. of one or more system components, such as end-point servers and the intervening networking devices if the function of interest is data transfer between the end-point servers. In embodiments, at least some of the gathered data may then be used (610) to determine one or more capacity windows of a resource or resources for performing a task or tasks.

In embodiments, determining a capacity window may comprise not only identifying windows but also computing the capacity for the system to perform a task or task within the identified time windows. In embodiments, the capacity of a window may be defined by the width of the window in time multiplied by the height from a low threshold level of a metric (e.g., N_lo) to an upper metric value (e.g., N_top). In embodiments, the upper matrix threshold value may be less than the full amount (e.g., N_full), but could be less or more than N_max measured in during the data gathering. In embodiments, since the graph from the gathered data (or estimated data) is a proxy for future operation of the system, a top threshold value, N_top, may be set and used to provide a buffer to allow for variance in the system. In embodiments, a weighted multi-factor formula of more than one resource may be used. In this disclosure, network bandwidth is used for the examples but one skilled in the art shall recognize general applicability to a number of resources, metrics, or applications.

Figure 7:
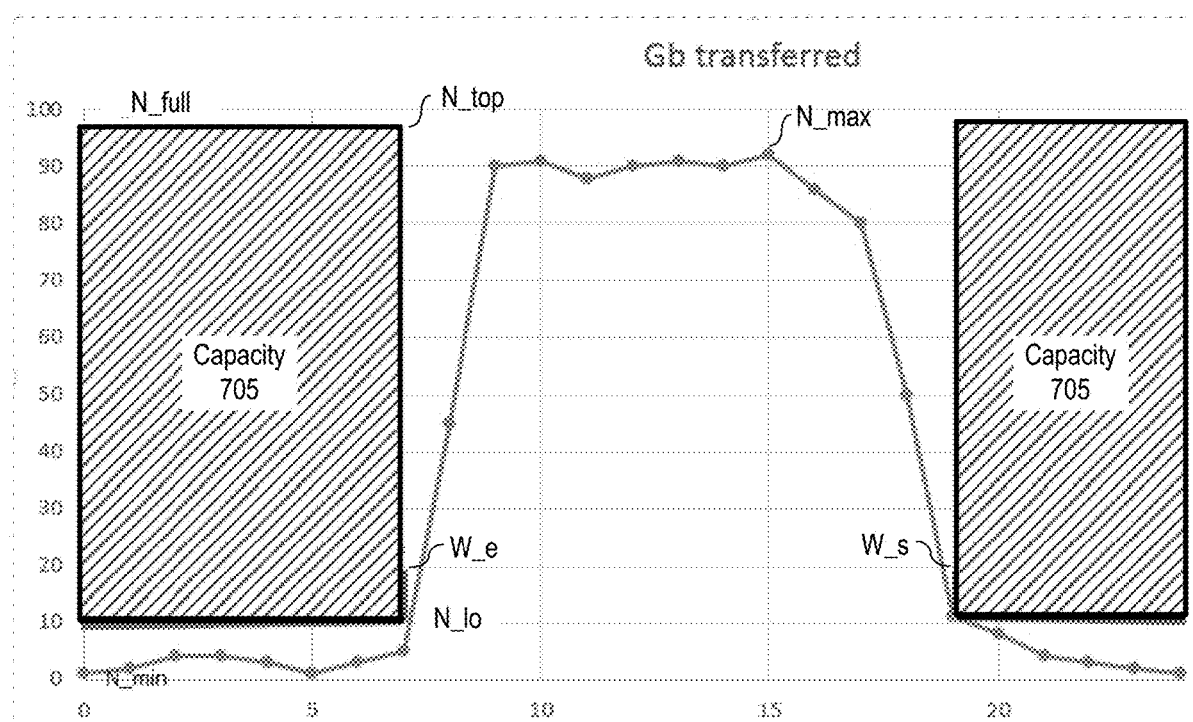
FIG. 7 is a diagram of FIG. 3 showing a resource capacity of the identified window, in accordance with embodiments of the present disclosure.

Consider, by way of example, the graph 700 depicted FIG. 7 which is a diagram of FIG. 3 showing a resource capacity window 705 of bandwidth, in accordance with embodiments of the present disclosure. For this case of network bandwidth, the height is in units of Gigabytes (GB) per hour and the width is in hours, so the capacity 705 is in units of GB.

Returning to FIG. 6, in embodiments, data is assessed (615) related to the desired task or tasks to be performed. For example, using email migration as the desired function or task, a pre-assessment of the sizes of the mailboxes on a source mail server may be used to plan a migration. Given the understanding of the resource capacity time window(s), such as the one shown in FIG. 7, a user may programmatically, manually, or both, select (620) a set of one or more tasks such that a computed estimate for completing the set of one or more tasks is less than or equal to a corresponding capacity window. Returning to the email migration example, a list or collection of mailboxes may be selected for migration in a resource time window by creating a collection of mailboxes where the sum of the sizes fills or closely fills but does not overrun the capacity of the resource time window for network bandwidth. Thus, for example, if a resource capacity window has a 20 GB capacity in a five-hour window, then a collection of mailboxes of nearly 20 GB in total size could be generated from the set of un-migrated mailboxes. In embodiments, other filtering criteria may also be provided and the migration administrator may provide input, such as in a drag-and-drop creation of this collection of mailboxes. In embodiments, the system, such as analyzer 102, may provide the user with a visualization of the capacity windows, the capacity needed for each of a set of task, a mapping of the capacity window to a scheduled set of tasks, or combinations thereof. For example, one or more graphical displays may presented to a user when scheduling a back-up of data, in which the size of the data is known and a collection of objects to be backed-up may be displayed by creating an overlay of the schedule object size over the resource capacity window(s). In embodiments, blocks may show used capacity and holes may show still-available capacity.

As previously noted, the analyzer 102 may automatically assigning tasks/jobs into available windows or providing suggestions, in which an administrator may verify or change the scheduled tasks. It shall be noted that many algorithms exists, which are known to those of ordinary skill in the art, that may be used to fit tasks to a capacity window or windows and that no such algorithm is critical to the present disclosure.

Once a set of one or more tasks (jobs/functions) have been scheduled, the set of one or more tasks may be scheduled for execution (625). In embodiments, the analyzer 102 may coordinate execution of the schedule tasks.

As the value and use of information continues to increase, individuals and businesses seek additional ways to process and store information. One option available to users is information handling systems. An information handling system (or computing device) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In embodiments, aspects of the present patent document may be directed to information handling systems/computing devices. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 8:
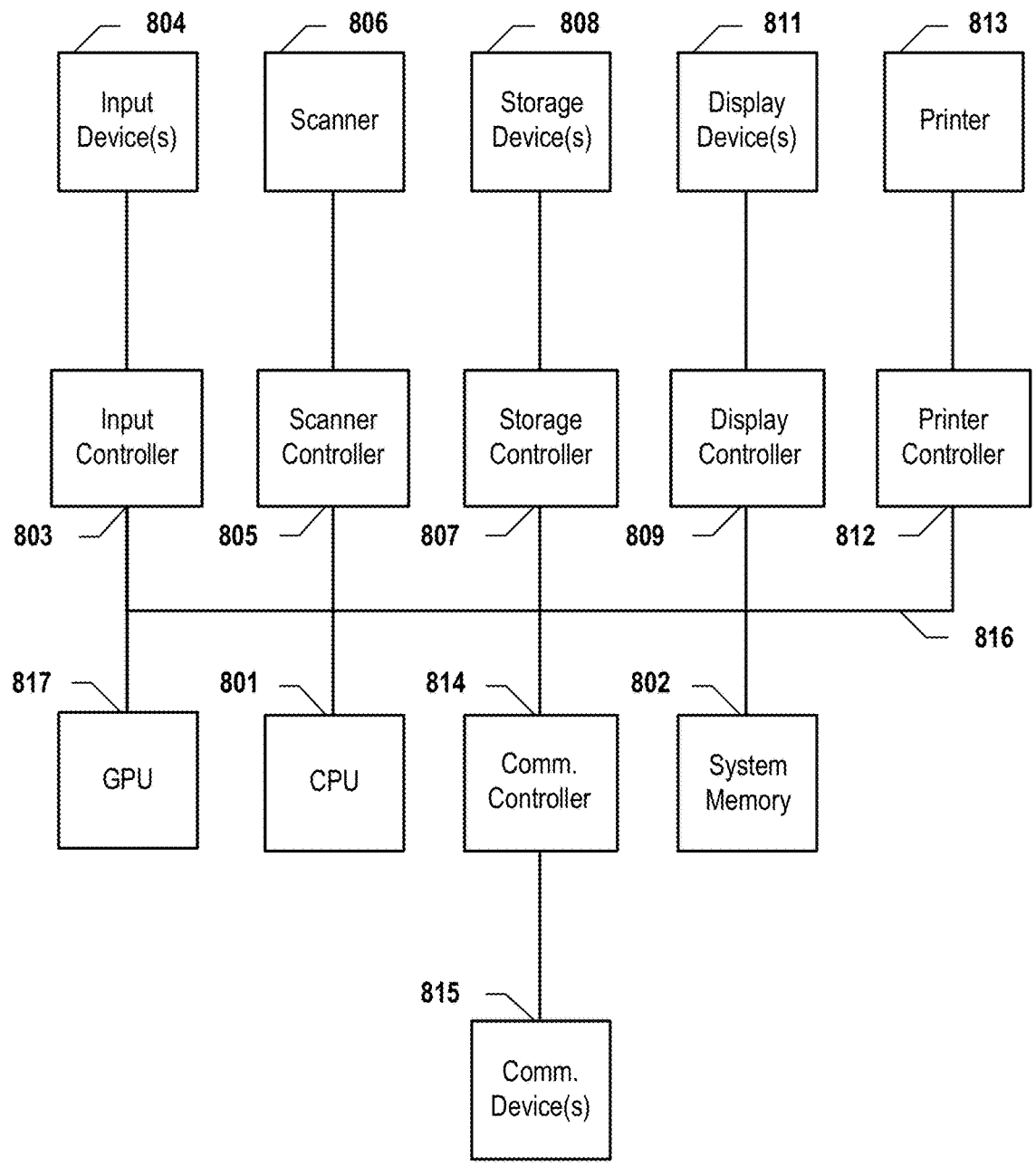
FIG. 8 depicts a simplified block diagram of a computing device, in accordance with embodiments of the present disclosure.

FIG. 8 depicts a simplified block diagram of an information handling system (or computing system) according to embodiments of the present disclosure. It will be understood that the functionalities shown for system 800 may operate to support various embodiments of an information handling system—although it shall be understood that an information handling system may be differently configured and include different components.

As illustrated in FIG. 8, system 800 includes one or more central processing units (CPU) 801 that provides computing resources and controls the computer. CPU 801 may be implemented with a microprocessor or the like, and may also include one or more graphics processing units (GPU) 817 and/or a floating point coprocessor for mathematical computations. System 800 may also include a system memory 802, which may be in the form of random-access memory (RAM), read-only memory (ROM), or both.

A number of controllers and peripheral devices may also be provided, as shown in FIG. 8. An input controller 803 represents an interface to various input device(s) 804, such as a keyboard, mouse, or stylus. There may also be a scanner controller 805, which communicates with a scanner 806. System 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present invention. Storage device(s) 808 may also be used to store processed data or data to be processed in accordance with the invention. System 800 may also include a display controller 809 for providing an interface to a display device 811, which may be a cathode ray tube (CRT), a thin film transistor (TFT) display, or other type of display. The computing system 800 may also include a printer controller 812 for communicating with a printer 813. A communications controller 814 may interface with one or more communication devices 815, which enables system 800 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method to schedule one or more computer-related tasks, the method comprising:
    receiving a selection of one or more components from among a plurality of components of a system about which data regarding one or more metrics of a system resource are to be collected, wherein the plurality of components of the system include at least one storage component;
    gathering data regarding the one or more metrics related to the system resource, including the at least one storage component, for the selected one or more components of the system;
    using at least some of the gathered data to identify a window for performing a task or tasks that affects the system resource;
    computing a resource capacity of the at least one storage component for the identified window, wherein computing the resource capacity for the identified window comprises computing a capacity for the identified window by taking a width of the identified window in time multiplied by a resource capacity height calculated as a difference between an identified low value of a metric and an identified high value of the metric;
    selecting a set of one or more tasks such that a computed estimate for completing the set of one or more tasks is equal to or less than the resource capacity for the window; and
    scheduling execution of the set of one or more tasks to be performed during the identified window.

2. The computer-implemented method of claim 1 further comprising:
    monitoring the one or more components with one or more monitoring systems; and
    gathering data for the one or more metrics for the one or more components.

3. The computer-implemented method of claim 2 further comprising:
    generating one or more displays for presentation on a user interface device that depicts as a function of time the one or more metrics associated with the one or more components.

4. The computer-implemented method of claim 1 wherein selecting the set of one or more tasks such that the computed estimate for completing the set of one or more tasks is equal to or less than the resource capacity for the window comprises:
    identifying an estimated period of time required to perform the set of one or more tasks as a function of the one or more metrics and a loading for each component associated with the set of one or more tasks.

5. The computer-implemented method of claim 1 wherein the identified low value is a threshold value, which is at or above values of a set of the gathered data.

6. The computer-implemented method of claim 1 wherein the identified high value is below the maximum capacity of the system resource.

7. A system, comprising:
    a selection system configured to receive a selection of one or more components from among a plurality of components of a system or one or more metrics related to a system resource to be monitored, wherein the plurality of components of the system include at least one storage component;
    a monitoring system that gathers data regarding the one or more metrics related to the system resource, including the at least one storage component, for one or more system components;
    a window analysis system that receives the gathered data and uses at least some of the gathered data to identify a window for performing a task or tasks that affects the system resource;
    an estimate system that receives the identified window and computes a resource capacity of the at least one storage component for the identified window, wherein the estimate system is configured to compute the resource capacity for the identified window by taking a width of the identified window in time multiplied by a resource capacity height calculated as a difference between an identified low value of a metric and an identified high value of the metric; and
    a package system that facilitates selection of a set of one or more tasks such that a computed estimate for completing the set of one or more tasks is equal to or less than the resource capacity for the window.

8. The system of claim 7 wherein the package system is further configured to schedule execution of the set of one or more tasks to be performed during a window corresponding to the identified window.

9. The system of claim 7 further comprising a modelling system configured to model the selected one or more components or the one or more metrics to generate a modelled estimate of usage data that is used as the gathered data.

10. The system of claim 7 wherein the package system is further configured to facilitate selection of the set of one or more tasks by automatically identifying a plurality of estimated periods of time during which a task or tasks can be performed as a function of the one or more metrics.

11. The system of claim 7 wherein the package system is configured to generate one or more user interfaces for display on a user interface that depicts available tasks to be completed and their associated capacity to facilitate a user selecting one or more tasks to be added or removed from the set of one or more tasks to be performed during the identified window.

12. The system of claim 7 wherein the selection system is further configured to:
    detect each of a set of available components and/or metrics;
    generate a display showing the set of available components and/or metrics; and
    receive a user selection of the one or more components or the one or more metrics.

13. The system of claim 7 wherein the identified low value is a threshold value, which is at or above values of a set of the gathered data and the identified high value is below the maximum capacity of the system resource.

14. A computer-implemented method comprising:
    receiving a selection of one or more components from among a plurality of components of a system about which data regarding one or more metrics of a system resource are to be collected, wherein the plurality of components of the system include at least one storage component;
    gathering data regarding the one or more metrics of the system resource, including the at least one storage component, for the selected one or more components of the system;
    using at least some of the gathered data to determine a window for performing a task or tasks related to the system resource;

computing a resource capacity of the at least one storage component for the identified window, wherein computing the resource capacity for the identified window comprises computing a capacity for the identified window by taking a width of the identified window in time multiplied by a resource capacity height calculated as a difference between an identified low value of a metric and an identified high value of the metric; and selecting a set of one or more tasks such that a computed estimate for completing the set of one or more tasks is equal to or less than a capacity window.

15. The computer-implemented method of claim 14 further comprising:

scheduling execution of the set of one or more tasks to be performed during a corresponding capacity window.

16. The computer-implemented method of claim 14 wherein selecting the set of one or more tasks such that the computed estimate for completing the set of one or more tasks is equal to or less than the capacity window comprises:

identifying an estimated period of time required to perform the set of one or more tasks as a function of the one or more metrics.

\* \* \* \* \*